Aug. 19, 1930.  F. WOLF  1,773,248

ACCESSORY DEVICE FOR COLLAPSIBLE TUBES

Filed Jan. 18, 1928  4 Sheets-Sheet 1

INVENTOR
Frank Wolf
BY C. P. Goepel
his ATTORNEY

Aug. 19, 1930.   F. WOLF   1,773,248
ACCESSORY DEVICE FOR COLLAPSIBLE TUBES
Filed Jan. 18, 1928   4 Sheets-Sheet 2
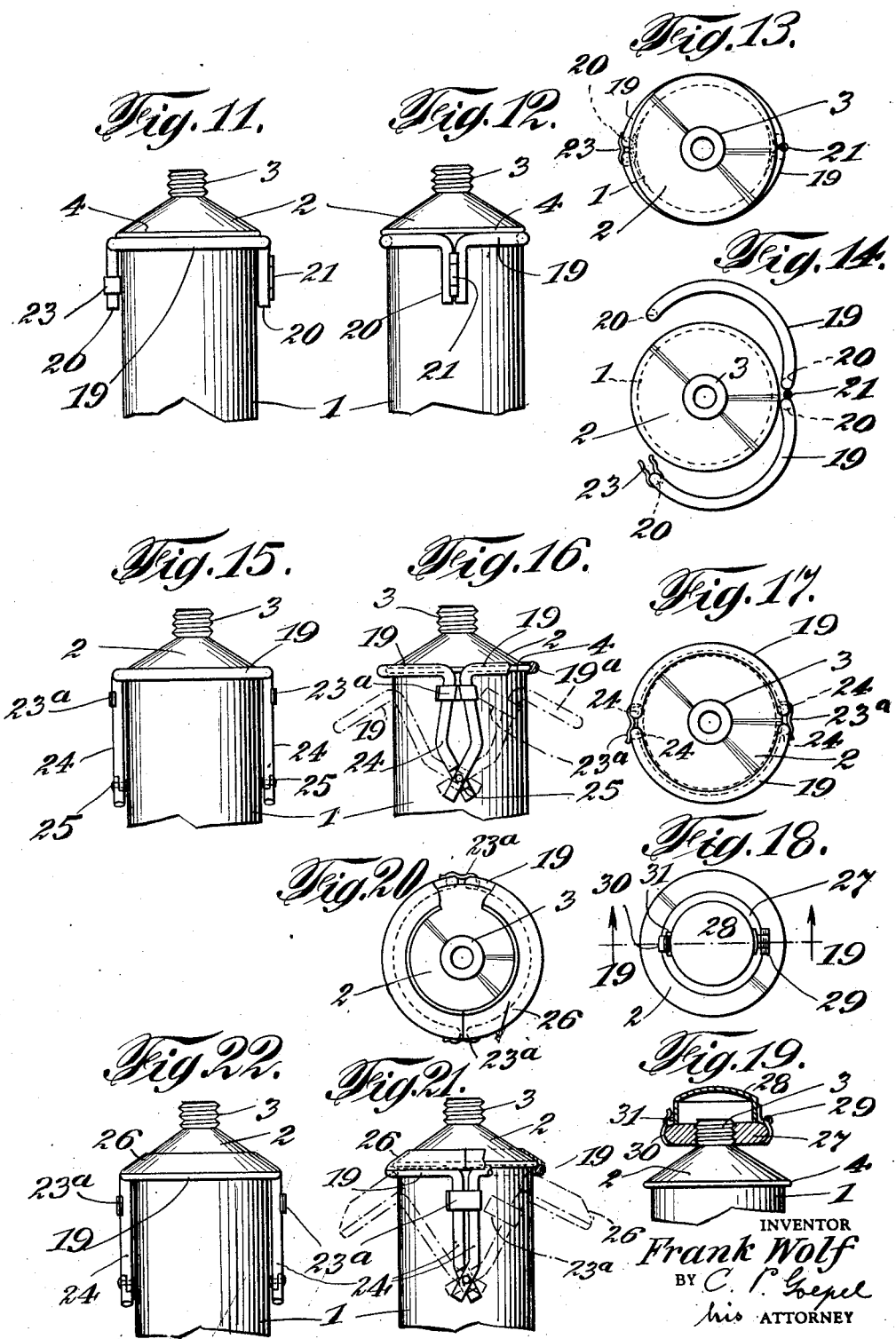

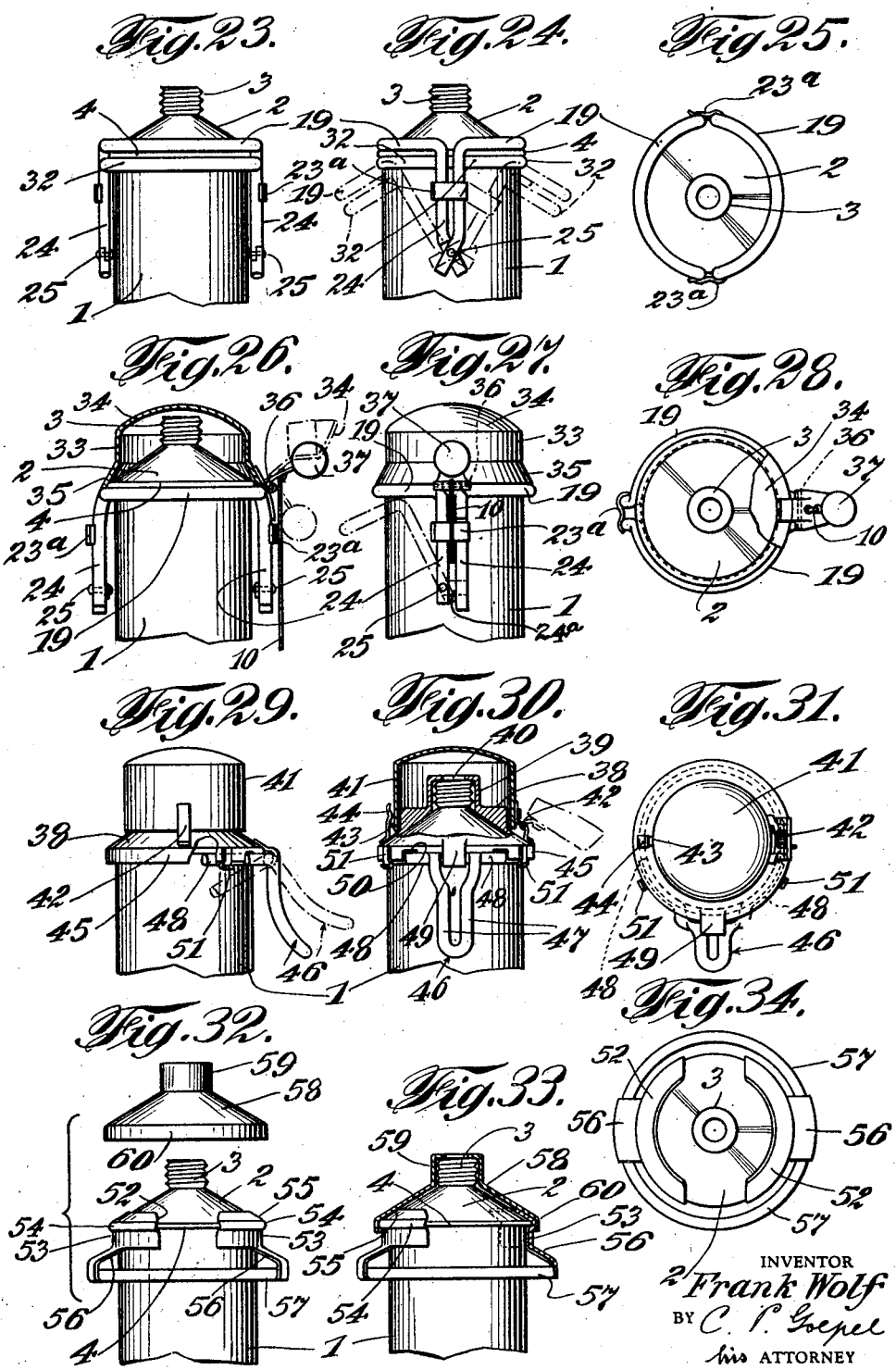

Aug. 19, 1930.  F. WOLF  1,773,248
ACCESSORY DEVICE FOR COLLAPSIBLE TUBES
Filed Jan. 18, 1928  4 Sheets-Sheet 4
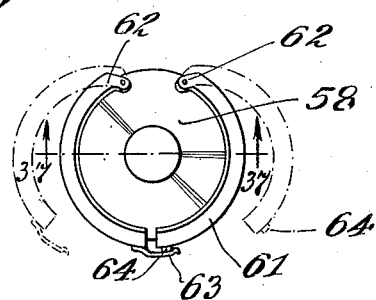
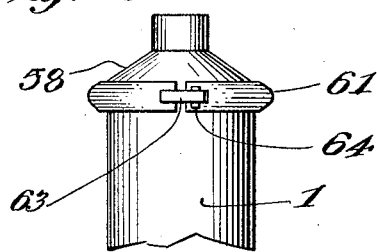
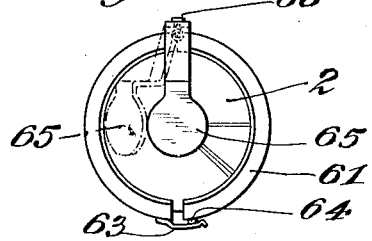
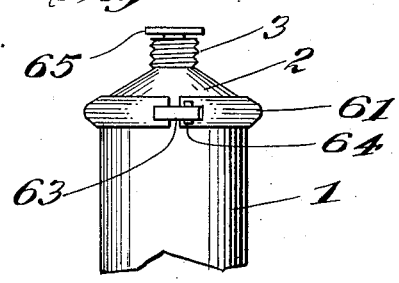
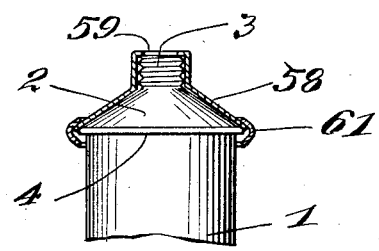
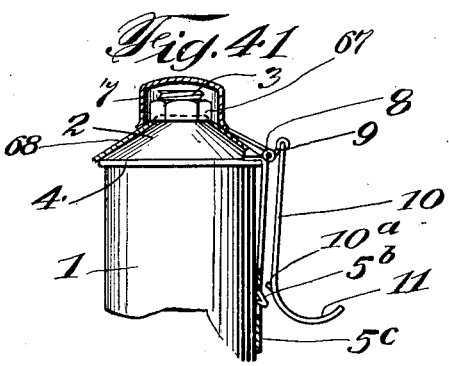
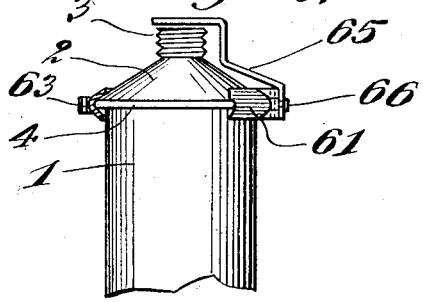
INVENTOR
Frank Wolf
BY C. P. Goepel
his ATTORNEY Patented Aug. 19, 1930

1,773,248

UNITED STATES PATENT OFFICE

FRANK WOLF, OF NEW YORK, N. Y.

ACCESSORY DEVICE FOR COLLAPSIBLE TUBES

Application filed January 18, 1928. Serial No. 247,499.

The invention herein relates to attachments for containers; and particularly to an accessory for detachably engaging a collapsible tube of the type in which tooth paste, shaving cream and other preparations are packed and sold.

Such tubes have been found to be objectionable in use because they are usualy made to be closed by screw caps, which are small and often prove hard to handle, are easily dropped and are not infrequently lost. Further the screw threads on the outlet neck to which the cap is secured are apt to afford a lodgment to some of the contents of the tube as the latter are squeezed out; and thus the discharge end of the tube cannot be kept clean.

My invention obviates these drawbacks and has for one of its objects to provide a simple and inexpensive device capable of being quickly mounted on a collapsible tube and removed therefrom. This device can be utilized in various ways; especially for enabling a better and more sanitary closure or shield to be attached to the outlet end of the tube in place of the regular cap, which can then be discarded.

The nature of the invention is fully set forth in the following description and accompanying drawings which illustrate several embodiments of the invention; but I of course reserve the right to make changes in shape, size and arrangement of the various parts that are embraced within the principle of the invention and do not exceed the scope of the appended claims.

Figure 1:
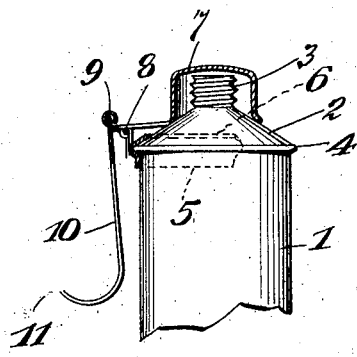
Figure 3:
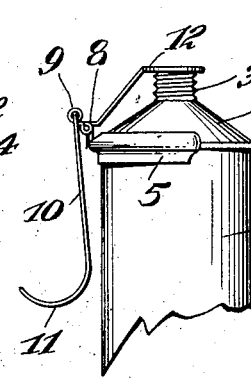
Figure 4:
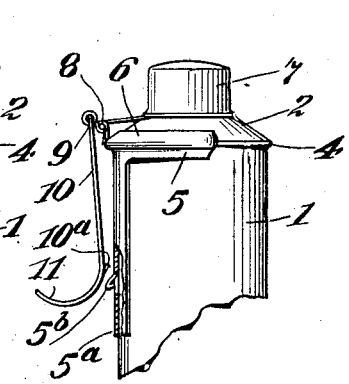
Figure 2:
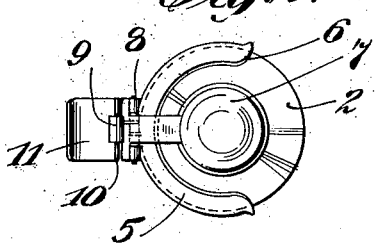
Figure 7:
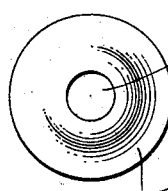
Figure 5:
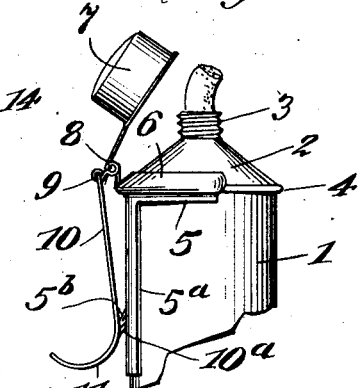
Figure 6:
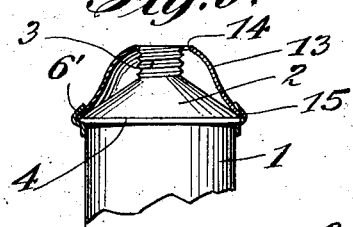
Figure 8:
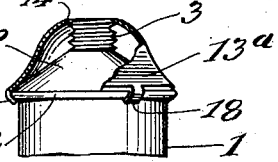
Figure 9:
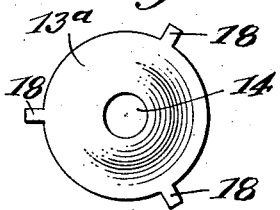
Figure 10:
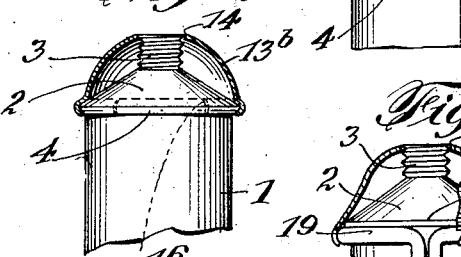
Figure 8A:
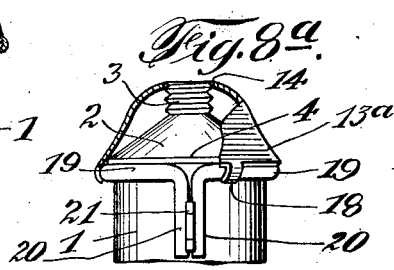

On the drawings Figure 1 is a side view of a collasible tubular container showing my attachment in place thereon, this attachment being partly in section, Fig. 2 is a top plan of what is shown in Fig. 1, Fig. 3 is a side elevation of an attachment similar to what is presented in Figs. 1 and 2, slightly modified, Fig. 4 is a side view of a second modification, Fig. 5 shows the attachment of Fig. 4 carrying a protecting member, raised to permit the contents of the tube to be discharged, Fig. 6 is a longitudinal section, and Fig. 7 is a top view, of another form of attachment for a collapsible tubular container, Fig. 8 is a view similar to Fig. 6 showing a different form of attachment, Fig. 8ª shows another way of mounting the attachment of Fig. 8 on such a container, Fig. 9 is a top plan of the device of Fig. 8, Fig. 10 is a sectional view of a further form of device for the discharge end of a collapsible tubular container, Fig. 11 is a side view; Fig. 12 is another side view, viewed from the left of Fig. 11, and Figs. 13 and 14 are top views, of devices that can be used for mounting a protecting member on the discharge end of a collapsible tubular container; the device being shown in closed position in Fig. 13 and in open position in Fig. 14, Fig. 15 is a side view; Fig. 16 is another side view seen from the right of Fig. 15, and Fig. 17 is a top view of another form of device for mounting a protecting member to be attached to the discharge end of a collapsible tubular container, Figs. 18 and 19 are respectively a top view and sectional view of a device to be secured on the usual threaded outlet neck of a collapsible tubular container, Fig. 19 being a section on line 19—19 of Fig. 18, Fig. 20 is a top view; Fig. 21 is a side view, and Fig. 22 is a side view seen from the right of Fig. 21, of a different type of attachment for the discharge end of a collapsible tubular continer, Fig. 23 is a side view; Fig. 24 is another side view seen from the left of Fig. 23, and Fig. 25 is a top view, of still another form of device for the discharge end of a collapsible tubular container, Fig. 26 is a side view partly in section; Fig. 27 is a view seen from the right of Fig. 26, and Fig. 28 is a top view, of another accessory for the discharge end of a collapsible tubular container, Fig. 29 is a side view; Fig. 30 a sectional view taken through the middle of Fig. 29, and Fig. 31 a top view of a still further modification;

Figs. 32, 33 and 34 are respectively a side elevation, a section and a top of an additional modified form of accessory for the discharge end of a collapsible tubular container, Figs. 35, 36, 37, 38, 39 and 40 present one more form in which my invention is embodied, and Fig. 41 shows a further embodiment of the invention.

On the drawings the same numerals identify the same parts throughout.

Referring first to Figures 1 and 2, the upper part of a body of a collapsible tubular container for tooth paste or the like is indicated at 1. It has a conical upper end 2 provided with a central threaded outlet neck 3 for the usual screw cap which closes the tube, a bead 4 may encircle the circumference of the conical end 2. This bead reinforces the tube and makes it hard and rigid around the edge at the end 2. The numeral 5 indicates a resilient clamping element approximately semicircular and shaped to grip the tube 1 around the end 2. This clamp may have a portion which engages the body 1 adjacent the bead 4; and be grooved inside to receive the bead 4; and have its upper edge turned over at 6 to rest upon the tube 2. To this clamp is secured a protecting or covering member in the form of a relatively large cap 7; the connection being provided by means of a hinge 8; and the cap has an extension 9 to which is pivotally connected an operating member 10 having one end which is bent up as shown at 11. The hinge 8 may be a spring hinge to keep the cap 7 normally covering the neck 3 and to lift the cap one merely pulls the member 10 down with the finger.

In Fig. 3 the protecting member is in the form of a flat plate 12 which folds over the end of the neck and is bent and connected to the clamp 5 in the same way.

Fig. 4 shows the attachment of Fig. 1 with the clamp 5 provided with an extension 5ᵃ running down along the side of the tube and the operating member 10 has a projection 10ᵃ to engage and hook under a similar projection 5ᵇ of extension 5ᵃ. By bringing these two projections into engagement the cap can be held in resting position, as indicated in Fig. 5.

Figs. 6 and 7 show the tube having a protecting member consisting of a cap 13 which has a central opening 14 which registers with the opening in the outlet neck 3. This member 13 is dome shaped and its lower edges turn outwardly slightly to rest upon the conical end 2 of the tube 1. It is held in place by means of a clamping ring 15 which encircles the end of the tube; this ring engaging the body 1 and being internally grooved to receive the bead 4 and having a portion 6' which is conical and overlaps and engages the lower edge of the member 13 to hold it in place. This ring may be a split ring to be more readily put into position.

In this form and all other forms of my invention the device is secured to the tube by engaging with sufficient firmness the rigid part of the tube afforded by the bead 4.

Figs. 8 and 9 show a similar protecting member 13ᵃ with a central opening 14 as before and the lower end of this member 13ᵃ is provided with lugs 18 which can be bent under the bead 4 to hold the member in place.

Fig. 10 shows a dome shaped member 13ᵇ, the lower end of which is beaded so that it can fit upon the bead 4 and this beaded lower edge is cut as indicated at 16 to enable the edge to yield to a sufficient extent to permit it to be slipped over the bead 4 when the member is being put on the tube. As soon as the cut or split lower edge passes the bead the resiliency of the portions thereof between the cuts causes this edge to grip the bead and hold the member firmly on the tube.

Referring to Figs. 11, 12, 13 and 14 I show a pair of semicircular arms 19, the ends of which 20 are bent to be perpendicular to the plane of the arms; one pair of ends is hinged together as indicated at 21 and the other pair are held together by means of a clasp or catch 23 carried by one of the other pair of ends 20; so that when this other pair of ends 20 is brought into proximity with each other and secured by the clasp 23 the two arms 19 will encircle the upper end of the tube just below the bead 4 with sufficient tightness to enable any kind of a protecting cover to be mounted on this tube.

The shield of Figure 8ᵃ can advantageously be used with the device of Figures 11 and 14, by bending the tabs or lugs under the arms 19. The lugs will then hold better than if bent against the tube under the bead 4.

In Figs. 15, 16 and 17 are shown a mounting device for attaching a protecting member to a collapsible tube comprising semicircular arms as before, the ends of which are bent as at 24, these ends being made to cross each other so as to be hinged together as at 25. This mounting is put on a collapsible tubular container by pulling the arms away from each other as shown by the broken lines in Fig. 16. It is then slipped on the end of a tube and the arms moved together and so held by means of catches or clasps 23ᵃ. These clasps are provided for each pair of arms 24, one of these clasps being mounted upon one arm of each pair to engage and hold the other arm of said pair and keep the mounting in place. The arms 19 may have a groove 19ᵃ to receive the bead 4.

In Figs. 18 and 19 the tube has an attachment carrying a protective cover and the attachment is secured upon the neck 3. It comprises a disc 27 having a screw threaded opening in the middle and a cap 28 on the disc 27 secured by a hinge 29. The disc 27 also carries a spring catch 30 to engage a projection 31 on the cap and hold it closed.

Figs. 20, 21 and 22 indicate a mounting similar to that of Figs. 15 and 17, comprising semicircular arms 19, the downturned ends of which are hinged together as before but the arms 19 may be below the bead 4 of the tube and on top of each arm is the semicircular half of a conical ring 26; this mounting is put on the end of a tube by pulling the arms 19 and the two semicircular halves of ring 26 apart as shown in broken lines of Fig. 21. When the arms are moved together and secured by the catches 23ª the two halves of the ring will rest upon the conical top 2 of the tube, and the arms 19 will engage the underside of the bead.

Figs. 23, 24 and 25 show a mounting for a protective covering to be utilized on the end of a collapsible tubular container which consists of a pair of arms 19 with down turned ends 24 similar to what appears in Figs. 16 and 21 and with catches 23ª. Secured to the ends 24 of each arm 19 and below the same is a semicircular arm 32, a space being provided between the arms 19 and 32 of each half of this device. When this device is put into place the arms 19 will be above the bead 4 of the tube 1 and the arms 32 below the bead so that the device cannot be slipped off.

Figs. 26, 27 and 28 illustrate a mounting device consisting of arms 19 of semicircular form with down turned ends 24 hinged together and provided with catches 23ª. Instead of the arms 24 being made to cross each other as in Fig. 24, for example, one of these ends has a projection 24ª to which the adjacent end of the other arm is pivoted. The arms 19 encircle the tube below the bead 4 and hinged to one of the arms is a protective covering 33 having a dome shaped top 34 and a flaring lower edge 35 which rests upon the two curved semicircular arms 19. It may be connected to one of these arms by a spring hinge 36 and be provided with a knob 37 to be pressed down to lift the cover 33.

In Figs. 29, 30 and 31 the tube 1 has a member 38 which rests upon the convex top 2 and has a neck 39 with an opening 40 which receives the neck 3. Upon this member 38 is hinged a cover 41 by means of a spring hinge 42 and this cover has a projection 43 to be engaged and held down by a spring catch 44 secured to the edge of the member 38. The member 38 has a down turned edge 45 which slips over the bead 4 and to keep this attachment from coming off the top of the tube I provide a retaining element 46 consisting of a piece of wire bent to provide parallel portions 47, the ends of which are secured to an arc shaped bar 48. This bar is mounted in a bearing 49 made integral with the edge 45 of the member 38. The central part of this bar may be on the outside of the edge 45 and this edge may have recesses 50 to permit the ends of the bar to pass between this edge 45 and body of the container 1. The two portions 47 afford a hold for the operator's fingers. When the attachment is put on the tube the retaining element will have the position shown in broken lines in Fig. 29. By pressing down upon the two parallel portions 47 the bar 48 swings upward into the notches 50 and is pressed tightly between the body 1 of the tube and the edge 45 so as to keep the attachment from being pulled off. The bar presses against the body of the tube adjacent the rigid bead 4, and against the underside of the bead. To remove the attachment the retaining element is actuated by taking hold of portions 47 and pulling them upward. The edge 45 may have spring portions 51 which grip the ends of the bar 48 and hold this bar releasably in place.

In Figs. 32, 33 and 34 the attachment consists of a pair of clamping elements 52, the ends of which are separated, each comprising a portion 53 to engage the body 1, a hollow bead 54 to receive the bead 4 of the container and a conical edge 55 to rest upon the conical end 2 of the tube. These elements 52 are connected by means of resilient arms 56 to a ring 57. To put the attachment in place the end of the tube 1 carrying the end 3 is simply pushed through the ring 52 until the bead 4 fits into the hollow bead 54 of the two elements 52 which yield to the extent required to receive the bead 4. Then the end of the tube is covered by a member 58 which fits upon the conical end 2 and has a neck 59 which covers the end of the neck 3. The member 58 may have a cylindrical edge which grips and fits tightly around the hollow bead 54 so that the member 58 will not come off.

By outlet end of the tube, is meant that portion which is usually made rigid and is of more or less conical shape and has an outlet neck or nozzle which is usually screw threaded. The detachable devices described, each attach to some portion of this outlet end and to the rigid portion thereof. In Figures 11 and 12 for instance the portion 19 compresses the flexible part of the tube and also abuts tightly against the rigid bead of the outlet portion. In Figs. 29 and 30 for instance, the portion 48 engages the flexible portion and abuts against the rigid outlet end.

In Figs. 35–40, the conical top is covered with a conical member 58, as in Figs. 29–31, having a neck 59 with opening 40 and to this member are secured curved clamping arms 61, pivoted at 62, with a catch 63 on one arm to engage a stop 64 on the other. To one ring is attached a cover 65, like the cover 12, pivoted at 66 to swing sidewise and downward and expose the opening 40.

In Fig. 41, I show a conical member 68 fitting against the top 2, and allowing the neck 3 to project through it. A nut 67 on the neck holds the member 68. On this member is mounted the cap 7, pivoted by a hinge at 8, with an extension 9 on the hinge to which is attached a member 10, with out-turned end 11 for the finger to pull down. The member 68 has an extension 5ᶜ, with a projection 5ᵇ to engage a projection 10ᵃ on the part 10, when the latter is pulled down to hold the cap in raised position. The nut 67 may be counter-sunk on its lower face to fit snugly down on the upper end of the member 68, as shown in dotted lines on Fig. 41.

I claim:

1. A device for attachment to a collapsible tube container, comprising a pair of semicircular arms to grip the end of the container between them and adapted to afford means for supporting a member on the end of the container.

2. A device for attachment to a collapsible tube container, comprising a pair of semicircular arms to grip the end of the container between them and adapted to afford means for supporting a closure member on the end of the container, said arms having bent ends pivoted together, and being movable about an axis traverse to said ends.

3. A device for attachment to a collapsible tube container having a soft body with a rigid conical top provided with a central outlet neck and a peripheral bead-flange, said device comprising a pair of movable semicircular arms to grip the body of the container at both sides thereof adjacent said flange, and means having effective cooperation with the arms for securing the arms in a position of adjustment with the body of the container securely gripped between them.

4. A device for attachment to a collapsible tube container having a soft body and a rigid conical top provided with a central outlet neck and a bead-flange at its periphery, the device including a pair of semicircular arms to grip the container adjacent the flange, said arms having bent ends pivotally connected together, and means having effective cooperation with the bent ends for securing the arms in a position of adjustment with the container gripped between them.

5. A device for attachment to a collapsible tube having a soft body and a rigid conical top with a central outlet neck and a bead-flange around its periphery, the device comprising a pair of semicircular arms with bent ends connected together, and a second pair of semicircular arms secured to said ends parallel to the first-named arms so that the attachment may be put on the tube to engage the same with the flange between said pairs of semicircular arms, and means securing said semicircular arms in gripping position.

6. A device for attachment to a collapsible tube container having a soft body and a rigid conical top with a central outlet neck and a bead-flange at its periphery, said device comprising a pair of movably connected semicircular arms for engaging and completely encircling the tube adjacent the flange, and means for securing said arms in operative position.

7. A device for attachment to a collapsible tube container, having a soft body and a rigid conical top with a central outlet neck and bead-flange at its periphery, said device comprising a pair of semicircular arms for engaging and completely encircling said container adjacent the flange, said arms being bent down at both ends thereof, said arms being pivotally connected at their adjacent ends, and means carried by said arms at their opposite ends for holding said arms in engaging position.

8. A device for attachment to a collapsible tube container having a soft body and a rigid conical top with a central outlet neck and a bead-flange at its periphery, said device encircling the container and comprising movable parts to engage the opposite sides of the tube at the flange thereon, and means for holding said parts in operative position.

9. A device for attachment to a collapsible tube container having a soft body and a rigid top with a central outlet neck and a bead-flange around its periphery, said device comprising hinged parts curved to correspond with the exterior of the tube, and encircling the tube at said flange, and means for holding said parts in operative position.

10. A device for attachment to a collapsible tube container having a soft body and a rigid conical top with a central outlet neck and a bead-flange at the periphery of the top, said device comprising curved parts to engage the tube at opposite sides of said flange and encircle the tube, said parts having their ends bent to extend along the length of the tube away from said flange, said parts being hinged together at their adjacent bent ends, and means carried by the remaining bent ends for holding said parts in operative position.

11. A device for attachment to a collapsible tube container comprising a pair of cooperating semicircular arms adapted to grip the end of the container, and extensions on said arms united by a pivot and adapted to have a closing action as levers to cause said arms to grip and securely maintain the container between them.

In testimony that I claim the foregoing as my invention, I have signed my name hereto.

FRANK WOLF.